UNITED STATES PATENT OFFICE.

SAMUEL R. BALL, OF LAPORTE, INDIANA.

TIRE-PRESERVING COMPOUND.

1,079,929.

Specification of Letters Patent. Patented Dec. 2, 1913.

No Drawing. Application filed December 3, 1912. Serial No. 734,698.

*To all whom it may concern:*

Be it known that I, SAMUEL R. BALL, a citizen of the United States, residing at Laporte, in the county of Laporte and State of Indiana, have invented new and useful Improvements in Tire-Preserving Compounds, of which the following is a specification.

This invention relates to a novel and improved compound adapted to be injected into bicycle, motorcycle and automobile tires for coating the inner tube or inside lining of the tire in such manner as to keep the same damp or moist and protect it from the disintegrating action of the air, whereby the tire will be maintained in a soft and elastic condition and its life or period of use prolonged.

In carrying my invention into practice, I provide a compound consisting of the following ingredients, combined substantially in the proportions named, to wit: molasses (of any suitable kind) 1 gal., oil of peppermint ½ oz., alcohol (preferably wood alcohol) ½ pt., and ordinary lamp black ¼ lb. These ingredients are thoroughly mixed by heat and agitation.

In using the compound, a proper amount thereof is stored in a suitable receptacle, which is placed in a pan of hot water or the compound otherwise internally heated to thin it out and increase its fluidity. The compound is then injected into the tire through the valve or valve stem thereof, the tire being turned or rolled back and forth to distribute the compound throughout the internal area thereof. The tire is then inflated, and when in service its rolling motion will cause the compound to form a uniform coating which fills all the minute air holes in the tire and protects the inner surface thereof against the action of the air. The molasses forms a sticky vehicle adapting the compound to adhere to the tire and have the proper consistency. The oil of peppermint on account of the menthol which it contains adapts the compound to penetrate the tire to an effective extent and causes the molasses to thicken to the desired degree when heated in combining the ingredients. The alcohol is employed to preserve the compound and prevent it from freezing. The lamp black is employed as a coloring material and also for giving body to the composition. Any equivalent of this material may be used.

This compound retains a viscid condition for an indefinite period and protects the tire from hardening and disintegrating under the action of the air and other causes, and thus keeps the tire soft and elastic, so that its period of usefulness will be considerably prolonged.

I claim:—

A tire preservative composition consisting of molasses 1 gallon, oil of peppermint ½ ounce, wood alcohol ½ pint and ordinary lamp black ¼ pound.

In testimony whereof I affix my signature in presence of two witnesses.

SAMUEL R. BALL.

Witnesses:
CYRIL PLUMBACK,
ELLSWORTH E. WEIR.